(12) United States Patent
Jenco

(10) Patent No.: US 6,869,081 B1
(45) Date of Patent: Mar. 22, 2005

(54) CONSTANT SEATING STRESS GASKET SYSTEM

(75) Inventor: John Michael Jenco, Charlotte, NC (US)

(73) Assignee: Jjenco, Inc., Charlotte, NC (US)

( * ) Notice: Subject to any disclaimer, the term of this patent is extended or adjusted under 35 U.S.C. 154(b) by 0 days.

(21) Appl. No.: 10/324,400

(22) Filed: Dec. 20, 2002

(51) Int. Cl.$^7$ ................................................. F16L 17/06
(52) U.S. Cl. ...................... 277/611; 277/616; 277/626; 277/639; 285/368; 403/337
(58) Field of Search .................... 277/609, 611–612, 277/616, 626, 639, 641–642, 644; 285/363, 368; 403/333–338, 409.1

(56) References Cited

U.S. PATENT DOCUMENTS

| | | | | |
|---|---|---|---|---|
| 2,955,857 | A | * 10/1960 | Smith | 277/611 |
| 4,095,809 | A | * 6/1978 | Smith | 277/611 |
| 4,109,923 | A | * 8/1978 | Tuckmantel | 277/612 |
| 4,155,571 | A | * 5/1979 | Gastineau et al. | 277/609 |
| 4,776,600 | A | * 10/1988 | Kohn | 277/611 |
| 5,607,167 | A | * 3/1997 | Franckx | 277/612 |
| 6,260,854 | B1 | * 7/2001 | Lemon | 277/609 |
| 6,340,162 | B1 | * 1/2002 | Hobaugh, II | 277/594 |
| 6,402,159 | B1 | * 6/2002 | Kohn | 277/68 |
| 6,460,859 | B1 | * 10/2002 | Hammi et al. | 277/596 |
| 6,598,883 | B1 | * 7/2003 | Hammi et al. | 277/596 |

OTHER PUBLICATIONS

An American National Standard "Metallic Gaskets for Pipe Flanges—Ring–Joint, Spiral–Wound, and Jacketed" ASME B16.20–1993 (Revision of ANSI B16.20–1973), The American Society of Mechanical Engineers, New York, NY.

* cited by examiner

Primary Examiner—Daniel P. Stodola
Assistant Examiner—Christopher J. Boswell

(57) ABSTRACT

A gasket system for sealed interfaces utilizes a carrier ring having inner and outer compression stops to account for and control flange rotation effects in order to achieve a uniform and constant gasket seating stress across the sealing region. The inner compression stop provides a fixed fulcrum for flange rotation. The inner and outer compression stops have different heights, dependent upon the characteristic flange rotation, that allow the orientation of the sealing material to be angularly matched to the flange side profile and that allow the sealing material to be fully captured within the sealing region upon full compression, minimizing creep relaxation. A visual compression indicator on the circumference of the carrier ring permits assembly of the interface without the use of specialized or calibrated tools.

18 Claims, 6 Drawing Sheets

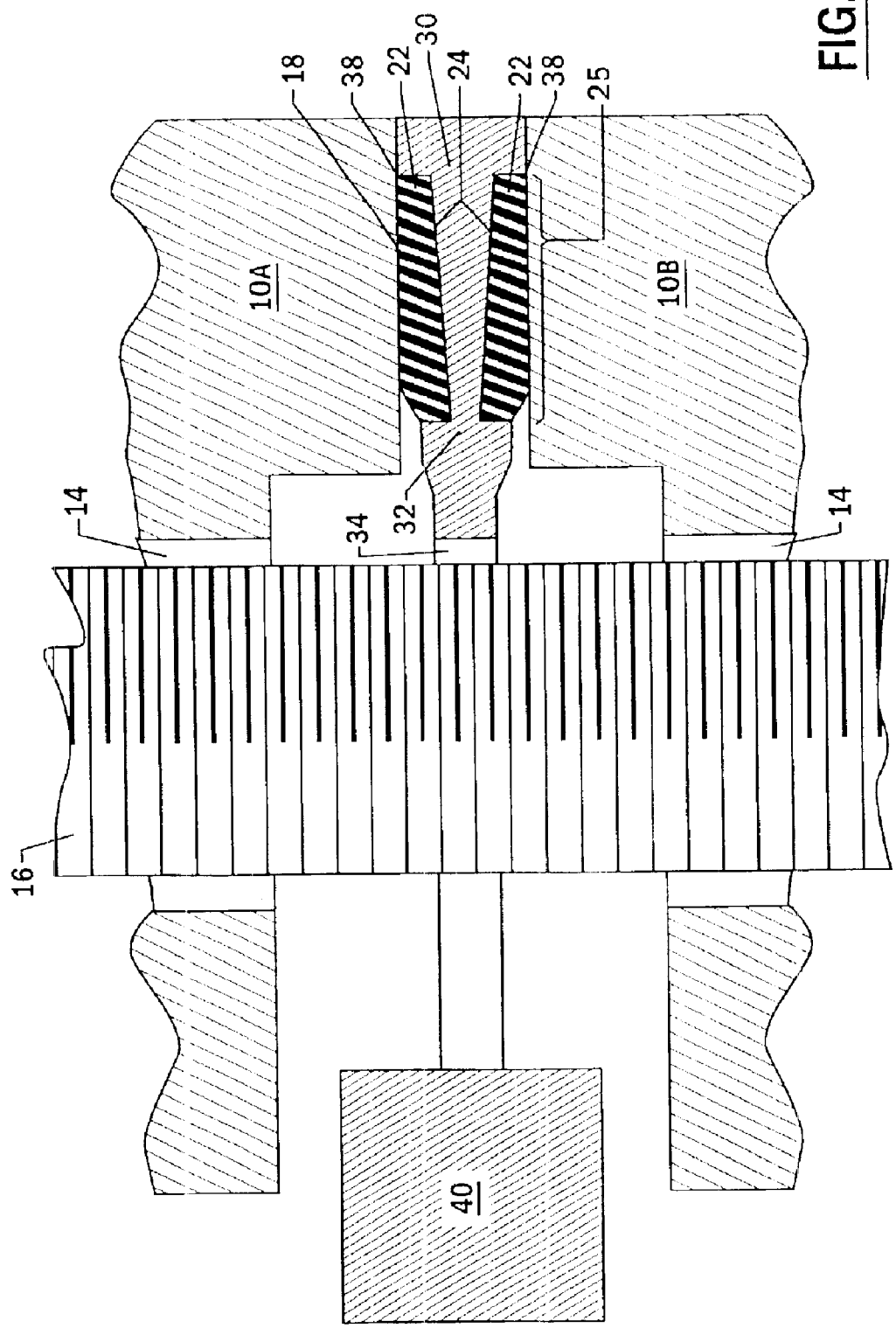

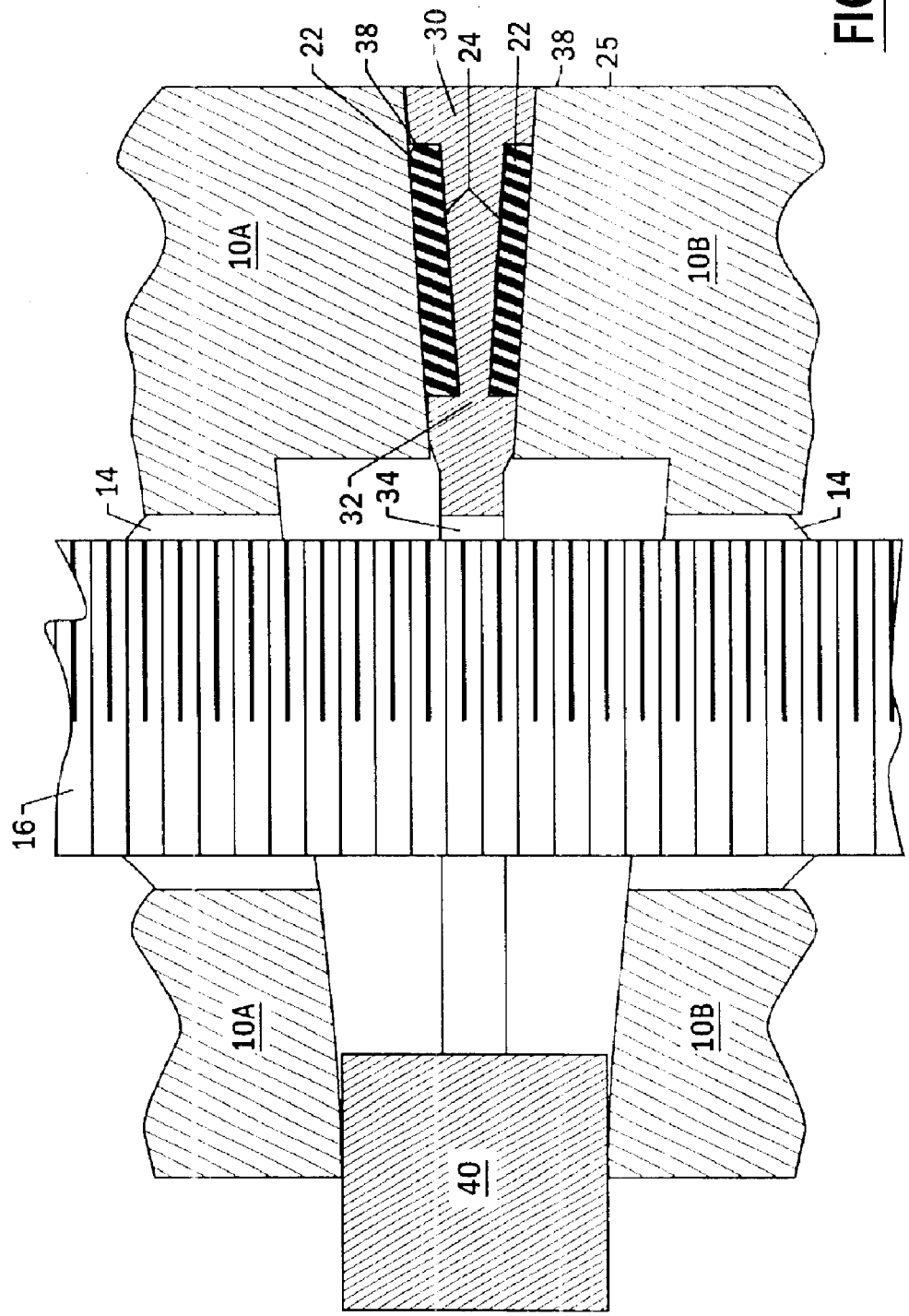

CONSTANT SEATING STRESS GASKET SYSTEM

FIELD OF THE INVENTION

The present invention relates generally to sealing systems for gasketed connections, and particularly to a gasket system applicable to flanged joints that is designed to achieve and maintain a constant and uniform gasket seating stress in flanged connections.

BACKGROUND OF THE INVENTION

The principal problem encountered in designing and operating effective gasketed connections is seal failure and the leakage associated therewith. Leakage from gasketed joints can be attributed to one or more of five root causes, including (a) sealing surfaces that do not meet the minimum physical conditions necessary to effect a seal, (b) insufficient gasket seating stress to effect a seal, (c) excessive gasket seating stress which results in damage to the sealing components, (d) a reduction in gasket stress due to flange rotation or in-service creep relaxation of the gasket sealing material, and (e) incompatibility of the gasket sealing material with the sealed fluid or the operating environment (which leads, over time, to gasket degradation).

Each of the aforementioned causes is typically regarded within industry as a failure of the gasketing material, but in reality only in case (e) is the gasketing material the source of the leak. In the remaining cases, connection life is reduced by the assembly practice, the joint design configuration, the joint condition, or some combination thereof, but the conventional approach has been to focus on the composition or configuration of the gasketing material to compensate for design or production flaws in the parts to be sealed.

Failures attributable to case (a) above, in which the gasket fails because of a sealing surface variance such as an out-of-flatness condition, misalignment of the sealing components, corrosion of the sealing surface, or scratches or other surface defects, are manageable by ensuring that the gasketing material is of a sufficient thickness (where possible) to accommodate the sealing surface variance and by adhering to effective manufacturing tolerances and effective maintenance practices. In the remaining cases (b) through (e), however, the design of components and selection of sealing materials are implicated.

Specifically, the gasket design and material selection effectively mitigates leakage events resulting from cases (b) through (e) when each of the following criteria is met (i) the gasket seating stress is effectively controlled; (ii) the gasket seating stress is evenly distributed over the entire gasket sealing area; (iii) a sealing material compatible with the environment is selected; and (iv) the in-service creep relaxation of the material is limited. Consequently, there is a need for a gasket that satisfies these design criteria.

Existing flat gasket designs generally fall into one of four basic groups: sheet gaskets, reinforced sheet gaskets, metallic gaskets, and spiral-wound gaskets. With sheet gaskets, which include gaskets made of rubber, compressed fiber, polytetrafluoroethylene (PTFE), graphite, and equivalents, the performance is limited, variously, by the primary sealing material's compression characteristics, the gasket's tendency to creep in service, the gasket's ability to withstand various combinations of temperature and pressure, and degradation of the gasketing material. Reinforced sheet gaskets arose in order to help mitigate blow out resistance and creep relaxation.

Metallic gaskets consist of a metal carrier ring upon either side of which a sealing material has been affixed, and further help to improve blow out resistance and to reduce creep relaxation. For example, in kammprofile gaskets, the profile is serrated and serves to reduce creep relaxation of the sealing material across the carrier ring, which providing concentric regions of increased gasket stress radially across the sealing surface. In other designs, the carrier ring extends radially outward beyond the sealing area, with provisions made to accommodate the fasteners in order to make use of the fasteners to align the gasket within the flange.

Spiral-wound gaskets include a central spiral-wound sealing component and an inner or outer ring (or both) that serves as a compression stop, and, in theory, represent the conventional pinnacle of sealability in terms of their blow out resistance, creep relaxation minimization, and limited compression. However, research and field experience have shown that most spiral-wound gaskets continue to be subject to creep relaxation and inward buckling of the metal windings, both of which potentially result in leakage. Only spiral-wound gaskets with both inner and outer rings tend to mitigate creep relaxation and winding buckling, although radial buckling of the inner ring has been noted in some applications.

A further problem associated with the use of spiral-wound gaskets involves standards within the manufacturing process; current manufacturing processes create variability, from gasket to gasket, in the density of the filler material—in some cases, a factor of as much as 3 in difference between similar gaskets. Thus, the repeatable achievement of a target gasket seating stress using spiral-wound gaskets is problematic. Further compounding this problem are assembly standards that allow a range of acceptable gasket compression; since gasket seating stress is directly correlated with gasket compression, spiral-wound gaskets are subject to differential seating stresses. Correspondingly, the compression stop rings in conventional spiral-wound gaskets serve only to limit the maximum compression of the gasket, rather than identifying the proper compression Moreover, where full compression does not exist, creep relaxation can occur.

Still another problem associated with the use of conventional gaskets is the need for calibrated assembly tools to ensure that the proper compression is achieved. It is important to note that the compression stops in existing gaskets provide only a maximum compression limit without regard to the proper compression required. Therefore, calibrated tools must be used with conventional gaskets in order to ensure that the correct compression is achieved.

Finally, existing gaskets are subject to variable seating stresses over their surface area due to the effect of flange rotation, which may be most pronounced in raised-face flanges. Flange rotation is a term used to portray the change in parallelism that occurs between the opposing flange faces as tightening of the joint occurs. The susceptibility to flange rotation varies according to component-specific factors that include flange size, material, and pressure class. For example, in raised-face flanges, once the opposing raised-faces each engage the gasket located in the central region of the flange, if additional preload is added to the fasteners, there is a tendency for the flange to pivot radially about the gasket, thus causing the flange faces to increase in relative proximity to one another as a function of distance from their axial centerline. This results in non-uniform gasket seating stresses over the sealing area, since the gasket seating stress increases radially from inside to outside due to the flange rotation. Consequently, required bolt preloads calculated to yield a desired gasket stress on assembly, may achieve that target gasket seating stress only at the outer circumference of the seating area, with the actual seating stress decreasing below the target seating stress as you move radially inward over the sealing area due to flange rotation.

What is needed, therefore, is a gasket whose design satisfies the aforementioned criteria and provides for the achievement of a correct, uniform gasket seating stress without the use of calibrated assembly tools, and for the maintenance of that stress over time.

SUMMARY OF THE INVENTION

These and other needs are met in the present invention, which includes a gasket in which the gasket seating stress is effectively controlled, the gasket seating stress is evenly distributed over the entire gasket sealing area, and in-service creep relaxation of the material is limited, and in which the sealing capability of the gasket is not primarily defined by the type and configuration of the sealing material, but by the configuration of the carrier ring. Generally, the present invention includes a carrier ring over which a sealing material suitable to environmental and process conditions has been affixed in the sealing region of the gasket. Various facets of the invention provide visual markers for achievement of the correct gasket compression (thereby eliminating or reducing the need for calibrated assembly tools), limit the compression of the sealing material to the desired compression, fully capture the sealing material in a confined space, and account for flange rotation in the achievement of the gasket seating stress.

More specifically, the present invention includes a carrier ring for a gasket for a flange having a flange side profile defined by flange rotation. The carrier ring includes an inner compression stop that has a first thickness and that defines an inner sealing edge, and an outer compression stop having a second thickness that is smaller than the first thickness and that defines an outer sealing edge. The carrier ring further includes a sealing region between the inner and outer compression stops. In the present invention, the inner compression stop forms a fixed fulcrum for the flange rotation, and the second thickness is selected so as to match the flange side profile between the inner and outer edges, according to the calculated degree of flange rotation for a particular flange.

In a further feature of the present invention, a visual compression stop is disposed on the outer circumference of the carrier ring and preferably extends beyond the edge of the flange, where it is visible to the person assembling the flange connection. The visual compression stop has a third thickness that is selected to indicate proper compression of the gasket material when the outer edge of each opposing flange is engaged with the visual compression stop.

In a further feature of the present invention, the sealing region is embodied as a groove, and a sealing region includes a sealing material having a density selected to produce a desired seating stress when the flange has engaged the carrier ring at desired compression stops. In the present invention, because of the differential between the first and second thicknesses, the seating stress induced by compression is uniform across the sealing region because the effect of flange rotation has been fully controlled and accounted for. Moreover, because the flange side profile is matched to the carrier ring side profile, the sealing material is fully captured within the groove, thereby eliminating any potential for gasket creep relaxation.

The present invention further includes a sealing region configuration for a gasket ring for sealing a flange having a characteristic magnitude of flange rotation. The sealing region configuration includes an open-faced groove disposed about a central bore and having a substantially trapezoidal radial cross-section angularly matched to the characteristic flange rotation magnitude in the sealing region. A sealing material is disposed within the groove, and the groove interfaces with a face of the flange to form a contained sealing region when the flange is at a desired compression. The sealing material may be partially precompressed, or crowned, about the region of its inner and outer circumferences to secure the sealing material within the groove by virtue of increased radial forces acting against the inner and outer groove walls induced in the material as a result of the precompression. The present invention further includes a gasket ring having the sealing region configuration noted above.

It should be noted that the radial cross-section is trapezoidal in the sense that at least two of the sides of the trapezoid are mutually parallel, and in a preferred embodiment are parallel to the characteristic angle of flange rotation in the sealing region. The configuration of the remaining sides (intersecting the characteristic angle) is dependent upon what is needed to retain the sealing material in the groove, and they may or may not be mutually parallel (if they are, the radial cross-section of the groove is a parallelogram).

The present invention further includes, more generally, a sealed interface system that includes first and second interfacing members (which may include a flange, a cover plate, or any other connection requiring a gasket) and a carrier member interposed therebetween. The carrier member includes, in radial succession, an inner compression region that has a first axial thickness, a sealing region, and an outer compression region having a second axial thickness. The interface system further includes a sealing member disposed within the sealing region. The first and second axial thicknesses are selected to match a characteristic angle of rotation of the first and second interfacing members, so as to form a substantially uniform seating stress in the sealing member. The carrier member further includes a visual compression indicator, preferably disposed circumferentially about the carrier member and having a thickness that is calculated to indicate, upon engagement of the interface, that the seating stress has been achieved.

BRIEF DESCRIPTION OF THE DRAWINGS

Further features, embodiments, and advantages of the present invention will be apparent from the following detailed description with reference to the drawings, wherein:

FIG. 3C is a cross-sectional detail view as in FIG. 3B, but with the system in a partially compressed state; and FIG. 3D is a cross-sectional detail view as in FIG. 3B, but with the system in a fully compressed state.

DETAILED DESCRIPTION OF THE PREFERRED EMBODIMENTS

Three aspects of gasket seating stress control the effectiveness of the seal. First, the correct target seating stress must be determined; practically, the target gasket seating stress must exceed the stress necessary to seal the maximum temperature and pressure combination of the process fluid. The calculation of this value is simple and is well within the ability of a person of ordinary skill in the art. Once the value has been calculated, the target gasket stress must be reliably achieved. Subsequently, the target gasket stress must be maintained over time.

In a preferred embodiment of the present invention, achievement of the correct gasket seating stress is accomplished by providing fixed compression stops about the inner and outer sealing surface circumferences. The compression stops are sized to withstand the flange compressive forces resulting from the assembly process for each given flange pressure class.

Figure 1:
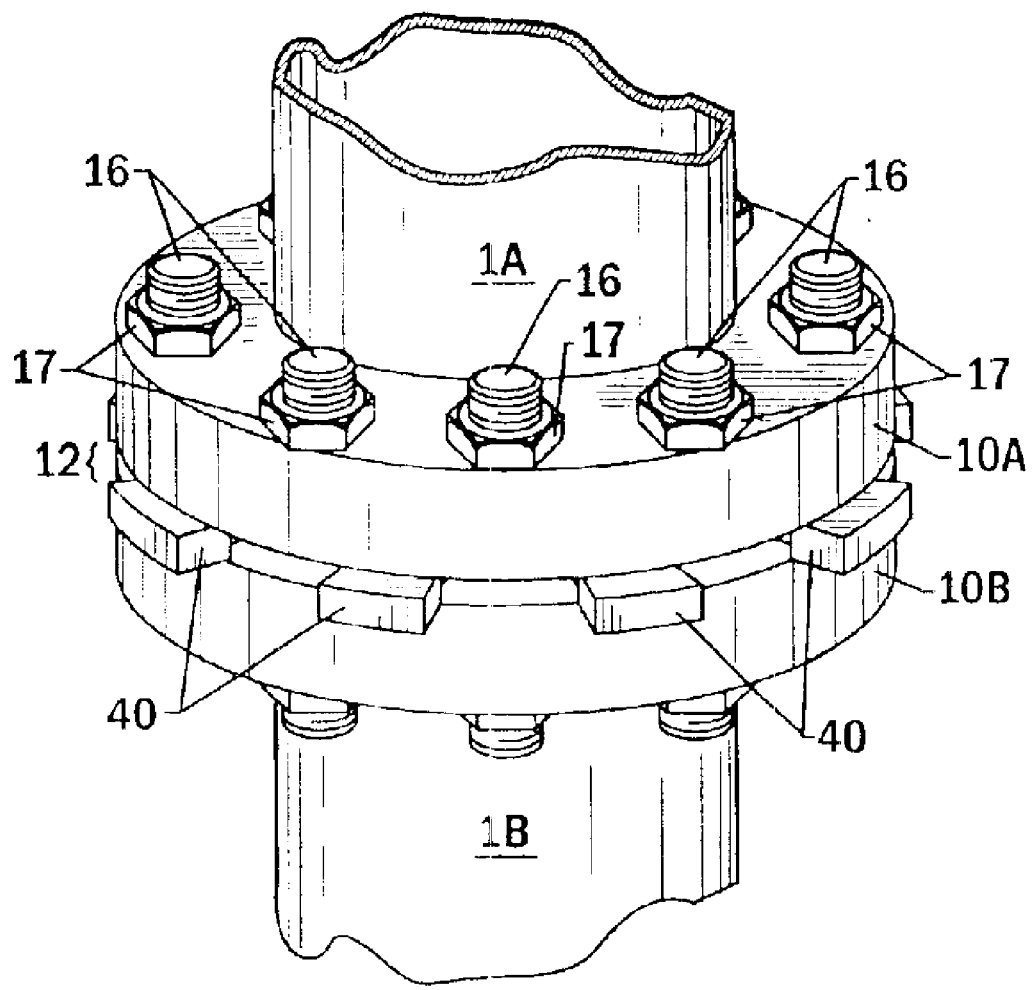
FIG. 1 is a general perspective view of a flanged connection according to the present invention.

Referring now to FIG. 1, a preferred embodiment of a constant seating stress gasket system according to the present invention is shown in a generalized perspective view, with most components not shown. The present invention is principally directed to flanged connections of the kind depicted in FIG. 1, but the principles that form the basis of the present invention are applicable to a wide range of connections, wherein achievement of a proper and constant gasket seating stress where conditions such as, or analogous to, flange rotation effects or gasket creep relaxation are present, and FIG. 1 is intended merely to be illustrative rather than limiting.

As can be seen in FIG. 1, pipes 1A, 1B are provided with flanges 10A, 10B at the interface point 12. Each flange 10A, 10B is provided with a series of holes 14 (see FIG. 2), through which threaded studs 16 are placed in order to permit the flanges to be connected and compressed together. Also visible in FIG. 1 are a series of visual compression indicators 40, which will be discussed in greater detail below. The visual compression indicators 40 form part of a carrier ring 20 (see FIG. 2) that is interposed between the flanges 10A, 10B at the interface point 12.

Figure 2:
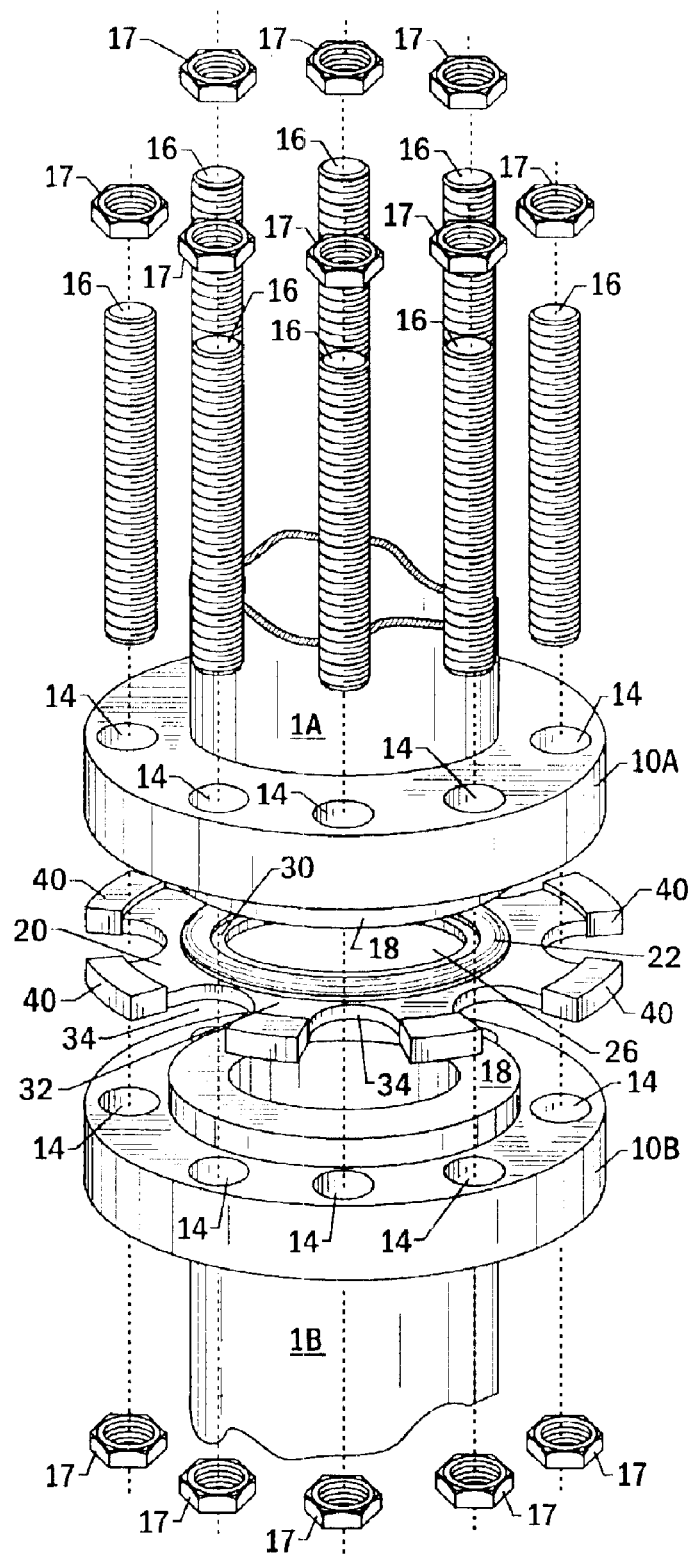
FIG. 2 is a perspective view as in FIG. 1 with the components thereof in exploded relation.

Referring now to FIG. 2, the components depicted in FIG. 1 are shown in exploded relation for illustration purposes. Flanges 10A, 10B can be seen in FIG. 2 to have raised faces 18. Although the present invention is particularly applicable to raised-face flanges, the present invention may likewise be applied to flanges having other face characteristics, such as flat or tongue-in-groove faces. In order to connect the pipes 1A, 1B, threaded studs 16 are placed through holes 14 in each flange and secured using nuts 17. Although it is convenient to use a threaded stud-and-nut connection, it is possible that another type of compressive connection could be used in place of the threaded studs 16 and nuts 17, without departing from the scope of the present invention. In the preferred embodiment, the connection between flanges 10A, 10B can be tightened as desired by exerting a torque upon the nuts. The number of threaded studs 16 and nuts 17 to be used is determined by the size, shape, and other physical characteristics of the flange, as well as by the amount of compressive force needed to effect a proper seal.

Interposed between flange faces 18 is carrier ring 20. Carrier ring 20 is preferably formed of a material, such as stainless steel, which is compatible with both the process fluid to be sealed and the compression forces to be exerted by the flange faces 18, and sufficiently rigid and intractable to form a positive compression resistance (the purpose of which will be discussed in greater detail below). Carrier ring 20 is provided on each face thereof with a sealing material 22, such as a gasket. The sealing material 22 is placed within a groove 24 on each face of the carrier ring 20, which groove 24 is positioned in the carrier ring 20 to align the sealing material 22 with the interfacing surface (flange face 18) of the each of the flanges 10A, 10B. Carrier ring 20 is further provided with a central bore 26, interior to the groove 24, to permit fluid flow through the pipes 1A, 1B. The region of the carrier ring 20 between the central bore 26 and the groove 24 forms an inner compression stop 30, partially against which the flange face 18 will rest upon compression. Radially beyond the groove is an outer compression stop 32, partially against which the flange face 18 will also rest, upon compression. Beyond the outer compression stop 32, the thickness of the carrier ring 20 is reduced to permit the flange face 18 to protrude below a line parallel to the carrier ring 20 and intersecting the top of the outer compression stop 32. Consequently, the outer compression stop 32 has an shoulder profile which may be square, angled, or some other desired configuration. It should be noted that the width of the outer compression stop 32 is depicted for clarity purposes in FIGS. 3A–3D as being somewhat wider than in a preferred embodiment, in which the width and shoulder profile would be configured to permit the flange face 18 to protrude below a line parallel to the carrier ring 20 and intersecting the top of the outer compression stop 32.

In a preferred embodiment, carrier ring 20 extends radially outward beyond the profile of the flange 18, necessitating the presence of threaded stud apertures 34, which serve to accommodate the threaded studs 16 when in the holes 14. Certain existing gaskets incorporate such apertures expressly for the purpose of using the threaded studs to align the gasket within the sealing region; no such purpose is intended herein. The particular configuration of the threaded stud apertures 34 in the carrier ring 20 is not critical to the present invention, as long as the threaded studs 16 are properly accommodated. Consequently, although a "star" configuration, in which the apertures are open to the radial exterior of the flange and the carrier ring 20 extends outward only interbetween the threaded studs 16, is depicted, a "closed" configuration, in which the bolt apertures 34 are closed, is equally possible without departing from the scope of the present invention. In a preferred embodiment, the star configuration shown in FIG. 2 is used as a matter of manufacturing convenience. Irrespective of the particular configuration of the bolt apertures 34, their presence permits the carrier ring 20 easily to be properly aligned with respect to the flange faces 18.

A series of visual compression indicators 40 are provided on the portion of carrier ring 20 extending beyond the profile of the flanges 10A, 10B. The visual compression indicators 40 serve to provide a visual confirmation of the achievement of the proper compression of the connection Because the visual compression indicators 40 are positioned to be partially within and partially outside the profile of the flanges 10A, 10B, during assembly the abutment of the flanges 10A, 10B with the visual compression indicators 40 may be seen rather easily, and the thickness of the visual compression indicators 40 may be selected, during manufacture, to indicate a proper degree of compression of the flange connection. This feature of the present invention will be discussed in greater detail below.

Figure 3A:
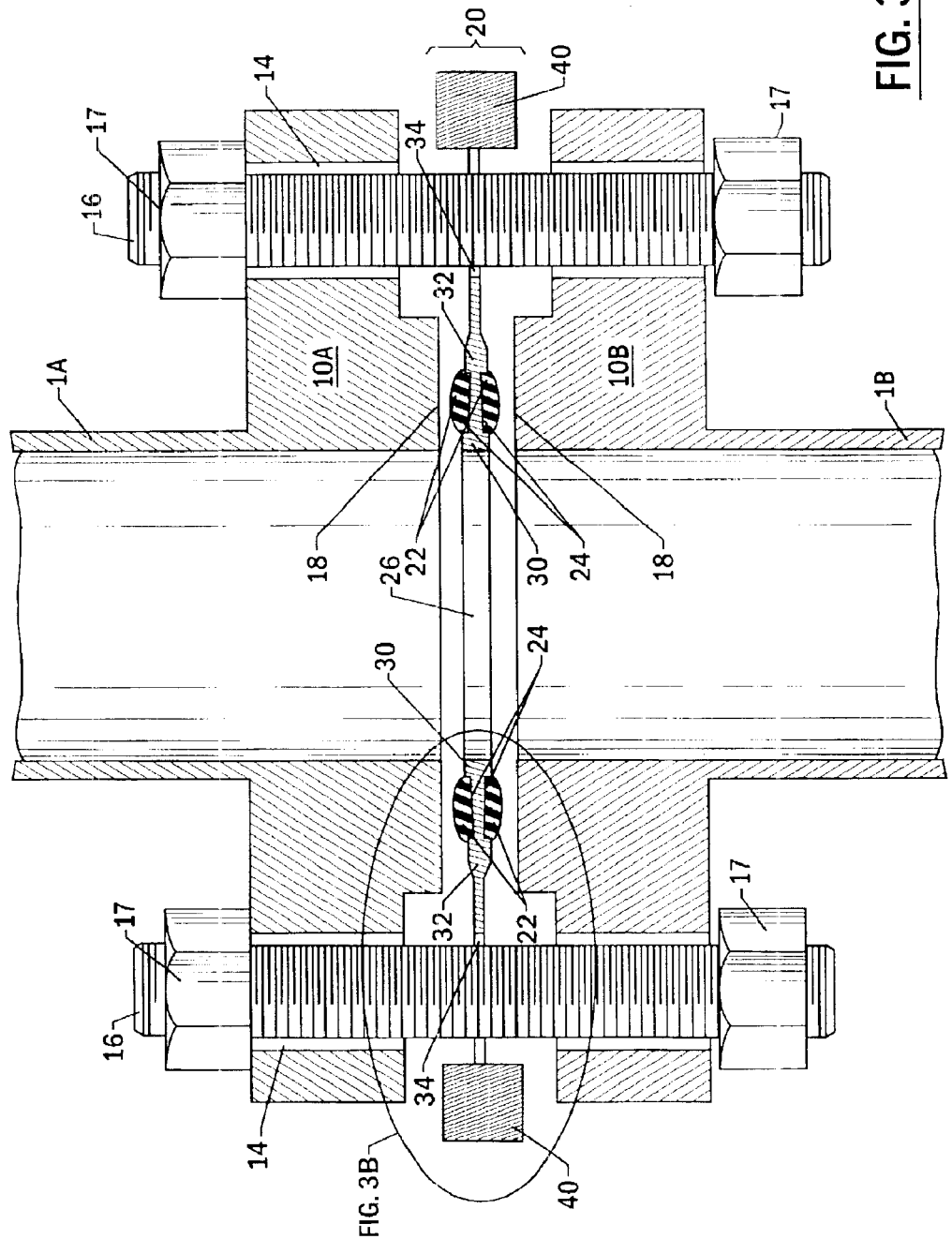
FIG. 3A is a cross-sectional view of a flanged connection and gasket system according to the present invention.

Referring now to FIG. 3A, a flange connection according to the present invention is shown in a diametric cross-section. As can be seen in FIG. 3A, in a preferred embodiment, pipes 1A, 1B each end in a flange 10A, 10B, which in the preferred embodiment has a raised face 18. Threaded studs 16 and nuts 17 cooperate to connect the flanges together, and carrier ring 20 is disposed between the flanges 10A, 10B to provide a sealing mechanism for the connection. As noted with regard to FIG. 2, carrier ring 20 has, on each side of the central bore 26, an inner compression stop 30, a groove 24 that defines a sealing region, sealing material 22 disposed in and extending outward from the groove, an outer compression stop 32, a bolt aperture 34, and a visual compression indicator 40.

Figure 3B:
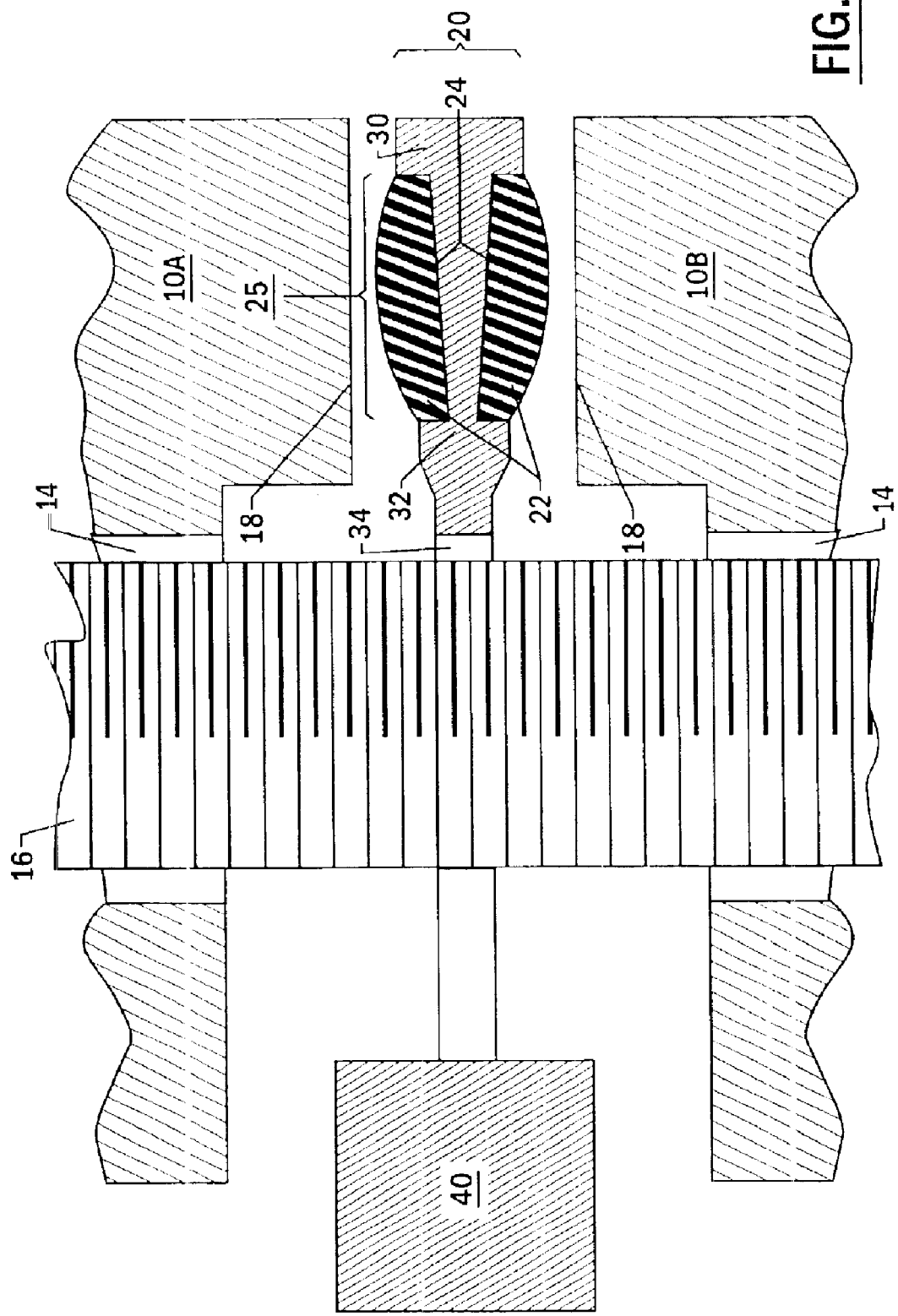
FIG. 3B is a cross-sectional detail view of a portion of FIG. 3A, showing the constant sealing stress gasket system of the present invention in an uncompressed state.

Referring now to FIGS. 3B–3D, a flange connection according to the present invention is shown in a detail view of the cross-section shown in FIG. 3A. Flanges 10A, 10B have raised faces 18 and are connected by threaded stud 16. Carrier ring 20 is disposed between the flanges 10A, 10B. Carrier ring 20 includes an inner compression stop 30 that defines the inner radius of the sealing region 25 and represents as a maximum the correct compression of the flange connection in that region Carrier ring 20 further includes an outer compression stop 32 that defines the outer radius of the sealing region 25. As can be seen in the figure, the thicknesses of the inner and outer compression stops 30, 32 are selected to be different, and specifically such that the thickness of the outer compression stop 32 is of a smaller magnitude than that of the inner compression stop 30. Consequently, the cross-section of the groove 24 within the sealing region 25 is at least trapezoidal in nature, if a line connecting the upper edges of the grooves is drawn, since this line is parallel to the base of the groove. (For the purposes of this application, a trapezoid is defined as a quadrilateral having at least one pair of parallel sides.) In the drawings, the sides of the groove 24 are also depicted as mutually parallel, so the groove cross-section is a parallelogram, but a variety of other configurations is possible. For example, the sides of the groove 24 may be designed such that the groove 24 is narrower on the open side than on the closed side, in order to facilitate retention of the sealing material 22 within the groove 24.

Referring now to FIG. 3C, when the flanges 10A, 10B are drawn closer together by tightening the threaded studs 16, the faces 18 of the flanges 10A, 10B engage with the inner compression stop 30 and begin to compress the sealing material 22. Because full compression of the sealing material 22 has not yet been achieved, the flange connection is not fully sealed. However, the engagement of the flange faces 18 with the inner compression stop 30 creates a fixed fulcrum 38, which serves as the axis about which the expected flange rotation will occur.

Referring now to FIG. 3D, the threaded studs 16 have been tightened to full compression, and the full effects of flange rotation can be seen. The flange faces 18 are brought into engagement with the outer compression stop 32, which serves to compress the sealing material 22 fully within the groove 24, without any opportunity for the gasket to creep out of the groove 24, and providing a positive seal in the sealing region 25 at the correct compression required to seal the particular connection. Full compression of the sealing material 22 within the groove 24, as well as engagement of the flange faces 18 with both the inner and outer compression stops 30, 32, is verifiable by inference because the outer edges of the flanges 10A, 10B have engaged with the optional visual compression indicators 40. Instead of using a visual compression indicator 40, calibrated tools could be used to apply a specified amount of torque to the nuts 17, sufficient to bring the flange faces 18 into engagement with the compression stops 30, 32.

Within the present invention, therefore, it is necessary to select thicknesses of the inner and outer compression stops 30,32 and of the visual compression indicator to control and account for flange rotation effects. When flange rotation is controlled by a fixed fulcrum that forms its axis, flange rotation is a known characteristic of each individual flange in its operating environment and depends principally on the composition and configuration of the flange. Because the composition and configuration of flanges is governed primarily by well known standards, it is possible to select compression stop and indicator thicknesses for a given flange composition and configuration merely by ascertaining the desired gasket seating stress and the magnitude of flange rotation effects at the various interfaces between the flange and the carrier ring.

In a preferred embodiment, the thicknesses of the compression stops 30, 32 are selected such that the line that would connect inner and outer compression stops of equal height and the line that connects inner and outer compression stops of the selected thickness forms a characteristic angle that is matched to the calculated flange rotation effect in the sealing region 25. This characteristic angle will, consequently, be parallel to the flange face 18, once the flange rotation effects have been generated by tightening of the connection. Because the flange face is fully in contact with both inner and outer compression stops 30, 32, the sealing material 22 is fully captured within the space defined by the groove and the flange face.

Similarly, the thickness of the visual compression indicator 40 is selected such that engagement of the flanges 10A, 10B with the visual compression indicator 40 indicates that the flange face 18 has fully engaged with the inner and outer compression stops 30, 32. This thickness may be calculated based upon the expected magnitude of flange rotation at the edge of the flange (as predicted for standardized flanges) when the flange face 18 has fully engaged with the inner and outer compression stops 30, 32. This magnitude of flange rotation is ultimately a function of the bolt stress required to compress the gasket a desired amount, taking into account various intermediary factors as thread condition, lubricant nut factor, lubricant placement, and proper installation of the fastener elements. If a visual compression indicator 40 is provided, then the proper seating stress for sealing the connection may be achieved merely by applying sufficient force to engage the flanges with the visual compression indicators, and no specialized or calibrated tools are necessary.

Another feature of the present invention relates to the selection and configuration of the sealing material 22. The sealing material 22 is preferably formed of flexible sheet graphite, but may be formed of another compressible, sealing substance, such as rubber, PTFE, or another material. Irrespective of the material to be selected, the sealing material will generally have an initial density of less than 100%, in order to permit compression to form a seal over sealing surface imperfections and irregularities. The sealing material 22 is preferably selected to be a material having a density such that when it is compressed according to the present invention, the resultant density is sufficient to form the desired seal at the desired gasket seating stress. As can be seen most clearly in FIG. 3B, the sealing material 22 generally extends beyond the profile of the groove, and progressing through FIGS. 3C and 3D, the sealing material 22 is fully compressed within the groove during the assembly process. Depending upon the desired resultant density and gasket seating stress, it is possible to vary the initial density of the sealing material 22, the dimensions of the groove 24, or the initial height of the sealing material 22, or some combination thereof, to achieve the desired result.

As can also be seen in FIG. 3B, the sealing material 22 is precompressed within the groove 24 and, in a preferred embodiment, is provided with a "crown." This precompression accomplishes two results. First, precompression permits the sealing material 22 to be held within the groove 24, because precompression of the sealing material 22 in the region of the groove edges increases the radial forces acting upon the groove 24 walls and increases the friction between the sealing material 22 and the groove 24 walls. Second, precompression with crowning decreases the likelihood that any sealing material 22 will creep outside the sealing region 25 during assembly. In addition to creating a non-uniform seal, such a creep would potentially create an interference between the flange face 18 and the inner or outer compression stops 30,32.

Consequently, the four main criteria mentioned above for effectively minimizing leakage events in sealed interfaces are satisfied in the present invention The gasket seating stress is effectively controlled, because the present invention accounts for and controls flange rotation. The gasket seating stress is evenly distributed over the entire gasket sealing area, because the orientation of the sealing material is angularly matched to the flange side profile. Because the present invention permits the composition of the sealing material to be selected based upon desired initial and final densities, a sealing material compatible with the environment may be easily selected. Finally, because the flange face and the groove work together with precompression to capture the sealing material fully, the possibility of in-service creep relaxation of the sealing material is limited or eliminated entirely.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A carrier ring for a gasket for a flange having a flange side profile defined by flange rotation about a rotational axis, the carrier ring comprising:
   an annular inner compression stop defining an inner sealing edge to a first axial depth relative to the rotational axis;
   an annular outer compression stop defining an outer sealing edge to a second axial depth relative to the rotational axis greater than the first axial depth; and
   an annular sealing region extending angularly relative to the rotational axis between the inner and outer compression stops.

2. The carrier ring of claim 1, wherein the inner compression stop forms a fixed fulcrum for the flange rotation and the second thickness is selected so as to match the flange side profile between the inner and outer sealing edges.

3. The carrier ring of claim 1, further comprising:
   a visual compression stop disposed circumferentially about the carrier ring and having a third thickness selected to indicate proper compression when the flange is engaged therewith.

4. The carrier ring of claim 1, wherein the sealing region comprises a groove.

5. The carrier ring of claim 4, wherein the sealing region comprises a sealing material having a density and height selected to induce a desired seating stress when the flange is engaged with the carrier ring at a desired compression.

6. The carrier ring of claim 5, wherein the induced seating stress is uniform across the sealing region.

7. The carrier ring of claim 5, wherein the sealing material is fully captured by the flange within the groove.

8. In a gasket ring for sealing a flange having a characteristic magnitude of flange rotation about a rotational axis, a sealing region configuration comprising:
   an open-faced groove disposed annularly in the gasket ring about a central bore therethrough and having a substantially trapezoidal radial cross-section angularly matched to the characteristic flange rotation magnitude in the sealing region, the trapezoidal cross-section of the groove being defined by an annular inner sealing edge forming an inner compression stop to a first axial depth relative to the rotational axis, an annular outer sealing edge forming an outer compression stop to a second axial depth relative to the rotational axis greater than the first axial depth, and an annular sealing region extending angularly relative to the rotational axis between the inner and outer sealing edges; and
   a sealing material disposed within the groove;
   wherein the groove interfaces with a face of the flange to form a contained sealing region when the flange is at a desired compression.

9. The sealing region configuration of claim 8, wherein the sealing material is partially precompressed to secure the sealing material within the groove.

10. The sealing region configuration of claim 8, wherein the substantially trapezoidal radial cross-section is parallelogrammatic.

11. A gasket ring for a flange having a characterisitc magnitude of flange rotation, comprising:
    a carrier ring comprising an open-faced groove, the groove being disposed about a bore and having a substantially trapezoidal radial cross-section angularly matched to the characteristic flange rotation magnitude in the sealing region to define inner and outer compression limits, the trapezoidal cross-section of the groove being defined by an annular inner sealing edge forming an inner compression stop to a first axial depth relative to the rotational axis, an annular outer sealing edge forming an outer compression stop to a second axial depth relative to the rotational axis greater than the first axial depth, and an annular sealing region extending angularly relative to the rotational axis between the inner and outer sealing edges; and
    a sealing material compressible within the groove and selected to have a desired density such that compression thereof within the groove to the inner and outer compression limits results in achievement of a desired gasket stress, such gasket stress being substantially uniform across the sealing region.

12. The gasket ring of claim 11, further comprising:
    a visual compression limit extending beyond an edge of the flange and having a thickness calculated to indicate achievement of the desired gasket stress.

13. A sealed interface system comprising:

first and second interfacing members;

a carrier member interposed between the first and second interfacing members, the carrier member comprising a radially inward annular compression region having a first axial thickness, a radially outward annular compression region having a second differing axial thickness, and an annular sealing region disposed radially between the inward and outward compression regions; and a sealing member disposed within the sealing region;

wherein the first and second axial thicknesses are selected to match a characteristic angle of rotation of the first and second interfacing members to form a substantially uniform seating stress in the sealing member.

14. The sealed interface system of claim 13, wherein the carrier member further comprises a visual compression indicator.

15. The sealed interface system of claim 14, wherein the compression indicator is disposed circumferentially about the carrier member and has a thickness calculated to indicate achievement of the seating stress.

16. The sealed interface system of claim 13, wherein at least one of the interfacing members comprises a flange.

17. The sealed interface system of claim 13, wherein at least one of the interfacing members comprises a cover plate.

18. A gasket for sealing a raised-face flange connection, the connection tightenable using at least one bolt, the flange having a side profile defined by flange rotation effects operable upon tightening the connection about a rotational axis, the gasket comprising:

a carrier ring comprising a groove about a bore forming a sealing region, an inner compression stop disposed radially inward of and defining an inner radius of the sealing region, an outer compression stop disposed radially outward of and defining an outer radius of the sealing region, a visual circumferential compression stop, at least one aperture for accommodating the at least one bolt and for properly positioning the carrier ring on the flange; and a sealing material disposed within and compressible within the sealing region;

wherein the inner compression stop defines an inner sealing edge to a first axial depth relative to the rotational axis, the outer compression stop defines an outer sealing edge to a second axial depth relative to the rotational axis greater than the first axial depth, and the sealing region extends angularly relative to the rotational axis between the inner and outer compression stops such that the inner compression stop defines a fixed fulcrum for flange rotation during tightening; and wherein a uniform seating stress is achieved across the sealing region when the flange circumference is fully engaged with the visual circumferential compression stop.

\* \* \* \* \*